(12) United States Patent
Mokhov et al.

(10) Patent No.: US 9,150,461 B2
(45) Date of Patent: Oct. 6, 2015

(54) BIOORGANIC AGENT FOR TREATING PLANTS (VARIANTS)

(75) Inventors: Victor Valentinovich Mokhov, Moscow (RU); Elena Victorovna Fomicheva, Nyzhny Novgorod (RU)

(73) Assignee: Astarta, LLC, Houston, TX (US)

( * ) Notice: Subject to any disclaimer, the term of this patent is extended or adjusted under 35 U.S.C. 154(b) by 0 days.

(21) Appl. No.: 13/148,122

(22) PCT Filed: Dec. 7, 2010

(86) PCT No.: PCT/RU2010/000738
§ 371 (c)(1),
(2), (4) Date: Mar. 6, 2012

(87) PCT Pub. No.: WO2011/084085
PCT Pub. Date: Jul. 14, 2011

(65) Prior Publication Data
US 2012/0269905 A1 Oct. 25, 2012

(30) Foreign Application Priority Data

Jan. 11, 2010 (EA) .................................. 201000175

(51) Int. Cl.
*C05D 9/02* (2006.01)
*C05G 3/02* (2006.01)
*C05F 9/04* (2006.01)
*C05F 11/10* (2006.01)

(52) U.S. Cl.
CPC .. *C05G 3/02* (2013.01); *C05D 9/02* (2013.01); *C05F 9/04* (2013.01); *C05F 11/10* (2013.01)

(58) Field of Classification Search
CPC ....................................................... C05D 9/02
See application file for complete search history.

(56) References Cited

U.S. PATENT DOCUMENTS 6,369,093 B1    4/2002    Elbe et al.

FOREIGN PATENT DOCUMENTS

| CN | 1948240 | 4/2007 |
| EP | 0569210 | 5/1993 |
| RU | 2091024 | 9/1997 |
| RU | 2240314 | 11/2004 |
| RU | 2360893 | 7/2009 |
| WO | WO 2008101620 A2 * | 8/2008 |

OTHER PUBLICATIONS

English translation of RU 2360893 C1 published on Jul. 10, 2009 (27 total pages).*
International Search Report for PCT/RU2010/00738.

* cited by examiner

*Primary Examiner* — Dennis J Parad
(74) *Attorney, Agent, or Firm* — Fish & Tsang LLP

(57) ABSTRACT

A high efficiency, environmentally friendly bioorganic product for treating agricultural and ornamental plants combining fertilizing, stimulating and protective property is proposed, in the first variant intended for pre-sowing seed treatment (tubers, bulbs); in the second variant for foliar application on cereals, vegetables, ornamental crops and potatoes.

Each of the variants of the proposed bioproduct contains microbiologically fermented organic agricultural waste, for example, cow or poultry manure, with microelements including copper, cobalt and zinc and macroelements: nitrogen, phosphorous and potassium in bound form available to plants, wherein the biological and organic constituents are combined. The product contains substances that have fungicidal and bactericidal properties, i.e., sulfur and benzoic acid, and phytohormones: auxins, gibberellics and cytokinines in different combinations for each of the variants of the product. One variant of the product also contains humic acids; the other, fulvic acids.

4 Claims, 2 Drawing Sheets

BIOORGANIC AGENT FOR TREATING PLANTS (VARIANTS)

RELATED APPLICATIONS

The present application is a U.S. National Phase Application of International Application No. PCT/RU2010/000738 (filed Dec. 7, 2010) which claims priority to Eurasian Patent No. 20100175 (filed Jan. 11, 2010) which are hereby incorporated by reference in their entirety.

The claimed invention relates to agriculture, more specifically to the manufacture of bioorganic products for the treatment of agricultural and ornamental plants throughout their life cycle from seed (tuber, bulb) to the end of their growth in order to protect plants from diseases and increase yield. These bioorganic agents are manufactured in the form of products based on microbiologically processed cow, pig, and chicken manure and other agricultural wastes.

The proposed inventions may be used both in plant cultivation and in the industrial treatment of agricultural waste.

The use of bioorganic products (hereinafter bioproducts) to raise farm crops is now especially timely, primarily because of the general trend toward a reduction in the use of traditional mineral and organic fertilizers in agriculture.

Natural organic fertilizers traditionally used in horticulture, for example untreated cow and poultry manure and the like (see V. A. Vasilyev et al., Organic Fertilizer Handbook, Moscow, Rosagroprom, 1988, pp. 39, 170) are relatively inefficient, since achieving acceptable yield figures requires that they be applied in very large amounts—from 3 to 12 and even up to 30 metric tons per hectare. Moreover, this untreated organic waste contains pathogenic microflora and viable weed seeds, which makes their use environmentally unsafe.

The heavy use of mineral fertilizers and chemical plant protectants is one of the reasons for the worldwide degradation of fertile land by chemicals (see, for example, G. V. Dobrovolsky, "The Planet's Silent Crisis," Bulletin of the Russian Academy of Sciences, 1997, vol. 67, No. 4, pp. 313-320).

It is known that plants do not fully assimilate chemical compounds entering the soil. They are accumulated in the soil and lead to a gradual change in the soil's chemical and physical properties and reduce the population of live beneficial microorganisms in the soil and degrade its fertility.

In contrast to the most effective chemicals, the use of bioproducts (biofertilizers) meets all requirements for the greening of agriculture, since these products of microbiological origin have a balanced composition of macro- and microelements and are enriched with a live culture of agronomically beneficial microflora which, pursuant to the law on environmental buffering, cannot be accumulated in the soil in excess and disrupt the ecological balance (see, for example, N. V. Pilshchikova, "Plant Physiology with the Fundamentals of Microbiology," Moscow, Mir, 2004, p. 171).

Bioproducts have a complex salutary effect on a plant in the following way:
  they improve nitrogen and phosphorous nutrition and protect plants from disease because beneficial microflora compete with phytopathogenic microflora, and destroy the latter with natural substances that have the appropriate anti-pathogenic activity (sulfur, benzoic acid, etc.);
  they stimulate plant growth and proper development and increase the assimilation of nutrients from the soil because they contain a significant amount of plant hormones and natural regulators of plant vital activity.

The use of these products increases plant yield, improves the quality of agriculture products by increasing the content of vitamins, protein, starch and other beneficial substances in them, supports production of early product and improves its storability. The manufacture of these products on an industrial scale is being set up using modern proven equipment (the latest-generation of special technologies and units for bioproduct manufacture, for example, according to RF patent No. 2315721, C02F 3/28, 2008).

There exists a bioorganic product for treating agricultural plants—bioorganic fertilizer according to RF patent No. 2191764, C05F 3/00, 2002. This biofertilizer contains moist, non-nitrogenous poultry, primarily, chicken manure and the calcium salts of nitrogen-containing organic acids and calcium hydroxide.

Although this biofertilizer does reuse poultry farm waste and regulate the soil's acid-alkali ratio, its effectiveness is fairly low: 5.5 metric tons of fertilizer must be applied per hectare to achieve the required indicators, and this involves high delivery and application costs.

Furthermore, this fertilizer is made by a batch, low-productivity process with high energy costs that requires the presence of service personnel, who come in contact with a harmful pollutant—fresh manure—and other harmful chemicals.

All this makes this biofertilizer inefficient and uneconomical to manufacture and use, which sharply limits its applicability.

There exists bacterial product Agat-25k for increasing plant yield according to RF patent No. 2111196, C05F 11/08, 1998, which contains bacteria of the strain *Pseudomonas aureofaciens*, VKM [National Microorganism Collection] I-1973D, a balanced solution of macro- and microelements, an autolyzate of soy seedlings, pine needle extract and chlorophyll-carotene paste.

This product is difficult to manufacture and has a high production cost and comparatively short shelf life—just 18 months. The microbial culture is specially grown in Agat-25k production; this method is expensive, the process cyclic, output is small, standard technologies cannot be used, and there is the problem of preserving and storing the microbial mass. Achieving the necessary yield results requires applying additional nutrients, bioactive substances (BAS), activators, etc.

There also exists a bioproduct in the form of biohumus—a product of the vital activity of Californian worms according to RF patent No. 2039029, C05F 11/08, 1995. This product is also difficult to manufacture and has a high production cost, since it involves a low-productivity batch process that requires manual labor.

There exists a bioproduct in the form of biological fertilizer under international application WO/2009/027544, C05F 11/08, 2009 that is used as a plant growth stimulant. This biofertilizer contains pure cultures of two species of agriculturally beneficial bacteria and a single phytohormone-indolyl-3-acetic acid (IAA). All components are immobilized on a solid substrate. The production process for this fertilizer is fairly complicated, multistaged and expensive, including the production of the microbial mass and its immobilization with other nutrients on a substrate and drying to ensure fertilizer stability.

There exists a bacterized fertilizer according to RF patent No. 2186049, C05F 11/08, 2002, used to produce peat-based soils and fertilizers. The applicability of this fertilizer is limited by its solid state and resulting methods of application, which are more complicated than the application of liquid fertilizers, and the significant time lag for solid fertilizers to begin to act compared to liquids. Furthermore, this fertilizer has a complex composition. Producing each ingredient of this fertilizer requires a separate long process: be it producing the biohumus or the bacterial culture and combining them in an ammonium environment with a pH no less than 9.

Moreover, the need to introduce mineral additives to this fertilizer in the form of aqua ammonia or urea greatly reduces the environmental friendliness of this product.

There also exists a multifunction fruit-forming bioactivator according to RF patent No. 2225383, C05F 11/08, 2004, the combination in which of only two phytohormones-cytokinins and gibberellics narrows its application, significantly limiting this product's use either as fertilizer or as a plant protectant.

There exists the bioproduct Albit for increasing plant yields and protecting plants from diseases according to RF patent No. 2147181, A01N 63/00, C05F 11/08, 2000. This bioproduct contains a hydrolyzate of the bacterium *Pseudomonas aureofaciens* VKM V-1973D (18-20 parts), a hydrolyzate of the bacterium *Bacillus megaterium* (39-40 parts), pine needle extract (5-6 parts), chlorophyll carotene paste (1-2 parts) and a solution of macro- and microelements (32-37 parts). The hydrolyzate of *Pseudomonas aureofaciens* is prepared by mixing a suspension of these bacteria with an optical density of 50-60 units with an equal amount of soy seedlings autolyzate and incubating the mixture at a temperature of 45-55° C. for 1-5 hr. The hydrolyzate of *Bacillus megaterium* is prepared by mixing a suspension of the bacterium with an optical density of 100-150 containing 20-80% biopolymer of poly-hydroxybutyrate acid with an equal amount of soy seedlings autolyzate and holding the mixture at a temperature of 50-55° C. for 1-5 hr.

Although this product increases plant yield and protects plants from diseases, it, like the other known bioproducts listed above, is complicated and expensive to produce, since the microbe culture is specially grown, the process is cyclic, output is low, and standard technologies cannot be used. Moreover, there is the problem of preserving and storing the microbial mass.

Achieving the necessary yield results requires applying additional nutrients, bioactive substances (BAS), activators, etc., as a result of which the production process for this fertilizer is too complicated and the cost of its production is too high.

There exists the bioproduct Pseudobacterin to stimulate plant growth and protect plants from diseases under USSR inventor's certificate No. 21805849, A01N 63/00, 1993. This product is a suspension of live *Pseudomonas putida* bacteria and has too short a shelf life (only two weeks).

The closest to the claimed bioproduct for plant treatment in technical substance and achievable effect from its use is the known bioproduct in the form of bioorganic fertilizer according to RF patent No. 2360893, C05F 3/00, C05F 11/10, 2009, which contains microbiologically fermented organic agricultural waste, for example, poultry manure, with microelements including copper, cobalt, and zinc and macroelements—nitrogen, phosphorous and potassium in bound form, wherein the biological and organic constituents are combined and the ingredients are in the following ratio:

macroelements. wt. % per absolute dry substance:

| | |
|---|---|
| total nitrogen | 4.0-7.0 |
| including ammonium nitrogen | 2.5-4.0 |
| phosphorus ($P_2O_5$) | 7.0-12.0 |
| potassium ($K_2O$) | 1.0-3.0 | microelements, mass concentration, mg/L, no more than:

| | |
|---|---|
| copper | 3.0 |
| cobalt | 5.0 |
| zinc | 23.0 |
| water, wt. % | 85-95, | phytohormones, humic and fulvic acids, which are found in the following ratio:

| | |
|---|---|
| auxins, mg/L (indolyl-3-acetic acid) | at least 3.0 |
| gibberellics, mg/L (with respect to gibberellic acid) | at least 17.0 |
| cytokinines, mg/L (with respect to kinetine) | at least 500.0 |
| humic acids, mg/L | at least 1000.0 |
| fulvic acids, mg/L | at least 1000.0 |

The recommended dilution of this product for root fertilizer is twenty-fold; 50-100 to have a guaranteed effect on the vegetative process; and 200 to stimulate generative processes. The manufacture of this bioproduct ensures complete and safe utilization of aggressive waste from poultry farms and livestock breeding complexes and increases the yield and quality of farm crops while reducing the required application doses.

At the same time, ongoing experimental studies of this type of bioproduct have identified new combinations of bioproduct ingredients that significantly increase the effectiveness and selectivity of its use, which greatly expands its applicability.

The objective of the claimed group of inventions is to expand the arsenal of existing technical means related to the further increase in the efficiency of the production of farm products and ensure the ability to use bioorganic fertilizer as an effective bioproduct that stimulates proper development and protects plants from disease to simultaneously achieve high farm crop yield and quality with minimum cost and labor.

This objective is accomplished using the technical result of the use of the claimed inventions, which involves expanding the composition of the bioproduct to ensure synergy from the natural balance of biologically active substances in new combinations and, as a result, to increase the agrochemical effectiveness of the bioproduct while simultaneously increasing the cost-effectiveness of its use.

This result is achieved by the first variant of the proposed bioproduct (given the provisional name Prorastin during the study), which is intended for use as an agent for preplanting treatment of seeds, tubers or bulbs (hereinafter denoted by the single term "seeds"), which consists of microbiologically fermented organic farm waste, e.g., cow, pig, or poultry manure containing microelements: copper, cobalt, and zinc and macroelements: nitrogen, phosphorous and potassium in a bound form available to plants, wherein the biological and organic constituents are combined, and the product's ingredients are found in the following ratio:

macroelements, wt. % per absolutely dry substance:

| | |
|---|---|
| total nitrogen | from 4.0 to 7.0 |
| including ammonium nitrogen | from 2.5 to 4.0 |
| phosphorous ($P_2O_5$) | from 7.0 to 12.0 |
| potassium ($K_2O$) | from 1.0 to 3.0 | microelements, mass concentration, mg/L, no more than:

| | |
|---|---|
| copper | 3.0 |
| cobalt | 5.0 |
| zinc | 23.0 |
| water, wt. % | 85-95, | the product also includes humic acids, gibberellics, auxins and cytokinines, in the following ratio:

| | |
|---|---|
| humic acids, mg/L | no less than 1000.0 |
| gibberellics, mg/L (with respect to gibberellic acid) | no less than 17.0 |
| auxins, mg/L (with respect to indolyl-3-acetic acid) | no less than 2.5 |
| cytokinines, mg/L (with respect to kinetine) | no less than 200.0 | and the product also contains substances with fungicidal and bactericidal properties with a weight concentration of:

| | |
|---|---|
| sulfur, mg/L | no less than 0.5 |
| benzoic acid, mg/L | no less than 29.0. |

The first variant of the proposed product intended for use as an agent for pre-planting seed treatment combines the properties of an effective growth stimulator, antis-stress adaptogen and protectant, ensuring 100% seed germination, sprouting 2-3 days earlier than usual, healthy and concurrent sprout development, activation of root formation, increased plant immunity to various diseases, resistance to stresses and adverse environmental factors, increased yield and an environmentally friendly product with increased vitamin content.

This technical result is also achieved by the second variant of the proposed product (provisionally named Polystin during the study), intended for use as an agent for external treatment of grains, vegetable crops and potatoes, which consists of microbiologically fermented organic farm waste, for example, cow, pig, or poultry manure containing microelements: copper, cobalt, and zinc, macroelements: nitrogen, phosphorous and potassium in a bound form available to plants, wherein the biological and organic constituents are combined, and the ingredients of the product are found in the following ratio:

macroelements, wt. % per absolutely dry substance:

| | |
|---|---|
| total nitrogen | from 4.0 to 7.0 |
| including ammonium nitrogen | from 2.5 to 4.0 |
| phosphorous ($P_2O_5$) | from 7.0 to 12.0 |
| potassium ($K_2O$) | from 1.0 to 3.0 | microelements, mass concentration, mg/L; no more than:

| | |
|---|---|
| copper | 3.0 |
| cobalt | 5.0 |
| zinc | 23.0 |
| water, wt. % | from 85 to 95, | the product also includes fulvic acids, gibberellics, auxins and cytokinines, in the following ratio:

| | |
|---|---|
| fulvic acids, mg/L | no less than 1000.0 |
| gibberellics, mg/L (with respect to gibberellic acid) | no less than 34.0 |
| auxins, mg/L (with respect to indolyl-3-acetic acid) | no less than 3.0 |
| cytokinines, mg/L (with respect to kinetine) | no less than 500.0, | and the product also contains substances with fungicidal and bactericidal properties with a weight concentration of:

| | |
|---|---|
| sulfur, mg/L | no less than 0.5 |
| benzoic acid, mg/L | no less than 29.0. |

The second variant of the bioproduct, intended for use as an agent for foliar application for cereals, vegetables and potatoes, combines the properties an effective growth biostimulator, anti-stress adaptogen and active protective fungicide and insecticide, providing the healthy and concurrent development of the plants, accelerating the onset of blossoming and maturing phases, forming strong plants with intense coloring and larger lamina size, extending vegetation times, increasing plant immunity to various infections, resistance to stresses and adverse environmental conditions, lengthening the storage life of vegetables and potatoes, increasing yield, and obtaining an environmentally friendly product with improved taste properties and elevated vitamin content. Moreover, for specified groups of crops:

for cereals: increased haulm density and plant height, increased ear length and fullness;

for vegetable crops and potatoes: increased weight of marketable tubers and weight of root crops, a change in the ratio of fractions toward an increase in marketable fraction;

for outdoor and greenhouse vegetable crops: an increased number of fruits, a reduction in the number of falling formed fruits, acceleration of fruit growth:

The presence in the bioproduct in both variants, in addition to macro- and microelements, phytohormones and humic acids in the first variant and of fulvic acids in the second variant, and of substances that possess fungicidal and bactericidal properties (sulfur and benzoic acid) in certain combinations is ensure as a result of methane fermentation in a continuous, single-stage process.

The proposed combination of components in the claimed bioproduct, as identified experimentally, promotes healthy plant development at all stages of growth and significantly increases the yield of any agricultural crop.

Both of the proposed variants of the claimed product constitute a group of two inventions related by a single inventive conception—support for and effective maintenance of a plant throughout its life cycle: from seed (tuber, bulb) to completion of growth, including effective aid to the plant in overcoming stress from the impact of adverse environmental factors and from the use of chemicals.

The technical relationship between the two inventions (the proposed variants of the bioproduct) is expressed as the sum total of a large number of identical essential features and by the presence of special technical features that determine the contribution to the art made by each of the claimed inventions.

Studies have shown that the greatest effect from the use of the proposed bioproduct is achieved during successive use of both variants of the bioproduct for the same plant: initially the first variant of the bioproduct (Prorastin) during presowing treatment of seeds, and then the second variant of the product (Polystin) during foliar application of the plants. Let us explain this in an example:

EXAMPLE 1

In the 2008 season the authors and specialists from the botany chair of the Nizhny Novgorod State Pedagogical University (NPSU) conducted a study at the university's test plot at Nizhny Novgorod Region (Borsk District) of the effect of the claimed bioproduct in the two variants on the yield and quality of potatoes of the Udacha variety (medium early): the first variant, Prorastin, and the second variant, Polystin, during their integrated use (see the NPSU report on tests on the impact of bioorganic products on a cultivar potato at the Lindovsky State Farm, 2008, pp. 2-4).

A two-stage procedure was used to conduct the study:
in the first stage the tubers were treated before planting with Prorastin with the following composition (the same composition of this variant of the proposed bioproduct was used in all subsequent experiments and examples in the studies presented in this description):
macroelements, wt. % per absolutely dry substance:

| | |
|---|---|
| total nitrogen | from 4.0 to 7.0 |
| including ammonium nitrogen | from 2.5 to 4.0 |
| phosphorous ($P_2O_5$) | from 7.0 to 12.0 |
| potassium ($K_2O$) | from 1.0 to 3.0 | microelements, mass concentration, mg/L, no more than:

| | |
|---|---|
| copper | 3.0 |
| cobalt | 5.0 |
| zinc | 23.0 |
| water, wt. % | from 85 to 95, | phytohormones and humic acids, in the following ratio:

| | |
|---|---|
| auxins, mg/L (with respect to indolyl-3-acetic acid) | 2.8 |
| cytokinines, mg/L (with respect to kinetine) | 252.0 |
| gibberellics, mg/L (with respect to gibberellic acid) | 17.5 |
| humic acids, mg/L | 1200.0 | substances with fungicidal and bactericidal properties with a weight concentration of: mg/L:

| | |
|---|---|
| sulfur | 0.56 |
| benzoic acid | 29.20. |

With a dilution of 1:100, the consumption of the bioproduct totaled 0.05 L/ton of tubers.

In the second stage the plants (tops) were sprayed in the budding and blossoming stages with the second variant of the proposed bioproduct—Polystin, with the following composition (this is same composition of the proposed bioproduct was used in all subsequent experiments and examples in the studies presented in this description):
macroelements, wt. % per absolutely dry substance:

| | |
|---|---|
| total nitrogen | from 4.0 to 7.0 |
| including ammonium nitrogen | from 2.5 to 4.0 |
| phosphorous ($P_2O_5$) | from 7.0 to 12.0 |
| potassium ($K_2O$) | from 1.0 to 3.0 | microelements, mass concentration, mg/L, no more than:

| | |
|---|---|
| copper | 3.0 |
| cobalt | 5.0 |
| zinc | 23.0 |
| water, wt. % | 85 to 95, | phytohormones and humic acids, in the following ratio:

| | |
|---|---|
| auxins, mg/L (with respect to indolyl-3-acetic acid) | no less than 3.45 |
| gibberellics, mg/L (with respect to gibberellic acid) | no less than 34.20 |
| cytokinines, mg/L (with respect to kinetine) | no less than 550.0, |
| fulvic acids, mg/L | no less than 1300.0 | substances with fungicidal and bactericidal properties with a weight concentration of: mg/L:

| | |
|---|---|
| sulfur | 0.55 |
| benzoic acid | 29.30 |

With a dilution of 1:100, 0.1 L/ha of bioproduct was consumed.

After the experiments were concluded, the following results were obtained.

TABLE 1

Results of Tests on Udacha Potatoes

| | Yield (hwt/ha) | Average weight (g) | Dry matter (%) | Starch (%) | Nitrates (mg/kg) |
|---|---|---|---|---|---|
| At the control plot without the use of bioproduct) | 173.5 | 531.7 | 20.30 | 11.2 | 51.7 |
| At the experimental plot (after tubers and tops were treated with the bioproduct) | 212.9 (+22.7%) | 652.9 | 23.34 | 13.8 | 37.4 |

The use of the proposed bioproduct for integrated successive treatment of tubers by the first variant of the product (Prorastin), and then the tops with the second variant of the product (Polystin) had a positive effect on the potatoes in the following way:
  on the parameters of the potatoes herbage:
    the number of stalks increased by 5.1% from one bush, stalk height by 4%;
    the leaf assimilation surface increased by 6%;
  on root system parameters;
    root biomass increased by 20%;
  on the parameters of the structure of the harvest:
    the number and weight of tubers per stalk increased;
    the average weight of tubers from one bush increased by 22.7%;
    the percentage of large and medium tubers rose by 360% and 17% respectively;
    the percentage of small tubers fell;
  on yield parameters:
    the productivity increased 22.7%;
  on quality parameters:
    the dry matter content increased by 16%;
    the starch content of the tubers increased by 23%;
    the nitrate content fell by a factor of 1.38;
  on indicators of the prevalence and development of potato blight:
    the prevalence of the disease decreased by a factor of 1.5 (from 12.8 to 8.4%);
    the development of the disease decreased by a factor of 3 (from 20.4 to 6.6%).

The results of the studies therefore showed that successive integrated treatment of Udacha potatoes with even very small doses of both variants of the bioproduct (Prorastin) and (Polystin) in 2008 had only a positive impact on all the quantitative and qualitative indicators of the yield and also contributed to a reduction in the prevalence and development of potato blight on potato plants.

One must note that the proposed bioproduct is made by microbiological synthesis of organic raw material of natural origin, during which, in the production of the proposed bioorganic product, the ferment is introduced into a bioreactor, where fermentation takes place once when it is started, and after fermentation the product is drained from the bioreactor by gravity.

The quantitative ratios of the ingredients of the claimed bioorganic product were obtained experimentally after a number of analyses of the composition of the product during its production and subsequent experimental use.

In addition to the macro- and microelements listed above and phytohormones and plant growth stimulators, the bioproduct contains an active microbial mass of bacteria that carry out methane digestion, which are introduced into the final product pursuant to the proven technology and from a fully test and reliable unit (according to RF patent No. 2315721).

The proposed bioorganic product is obtained by methane digestion of agricultural waste, for example, cow, pig, and poultry manure, etc., using a ferment containing methane-forming bacteria, for example, Methanobacterium species.

The fertilizer production unit is fully automated. The process is continuous and carried out in the following sequence: the initial raw material enters the intake hopper from which it is pumped to an intermediate tank. From the intermediate tank the raw material is fed by a metering pump to a bioreactor, where methane (anaerobic) digestion of the initial raw material takes place at a range of temperatures from +40 до +56° C. The microbiological ferment is introduced into the raw material once when the bioreactor is started and is prepared in the following way.

The ferment is prepared by anaerobic (methane) fermentation of fresh cow, horse and goose manure in a ratio of 1:(1.5-2.5):(2.5-3.5).

The digested manure—finished product—is gravity drained from the bioreactor to the finished product hopper. At the same time, one more useful product of the processing of the raw material—biogas produced during digestion—is removed from the bioreactor by a compressor pump and delivered to the boiler plant for use as a high-efficiency fuel.

The process results in a bioorganic product constituting a liquid from light brown to dark brown color with an acidity (indicator of hydrogen ion activity) from 7 to 8.5 pH. The weight concentration of toxic impurities is far below the maximum allowable concentration (approximate permissible concentration) for soils and the product is pure from the public health and hygiene standpoint: the index of sanitary indicator microorganisms (bacteria of the group of intestinal bacilli and enterococci) is from 1 to 9 sp/g and there are no viable worm eggs or larvae or pathogenic bacteria, including salmonella.

This microbiological process results in the formation of a balanced composition, including a set of macro- and micro-nutrient elements, an additional nutrient reserve in the form of humic and fulvic acids, live microorganisms capable of processing this reserve, phytohormones—regulators of plant vital activity, and substances with fungicidal and bactericidal properties such as sulfur and benzoic acid in certain combinations which, taken together, provide effective aid to a plant in overcoming stress from the impact of adverse environmental factors and from the use of chemicals.

It is known that plants' ability to regulate their functions and adapt to adverse factors determines their survival in a constantly changing environment.

Phytohormones have a key role among plant regulatory systems. They regulate plant growth and development, ensure the integrity of the plant organism, coordinating the interaction of individual cells, tissues and organs.

Phytohormones participate in the formation of plants' adaptive response to lack of moisture, extreme temperatures, soil salinity, the presence of heavy metal salts in soils, insufficient oxygen, high or low light, UV radiation, elevated content of toxic gases in the atmosphere, the impact of pathogens, viruses, and the like.

Phytohormones-biologically active compounds exert a physiological effect at very low concentrations and, acting together, may intensify one another's effect, if there is an antagonistic relationship among individual components of plant hormone systems. Studies established that all phytohormones are in the proposed bioproduct in significant quantities. Quantitatively the predominant phytohormones in this bioproduct are cytokinines, followed by gibberellics and auxins.

It is known that phytohormones act best in combination. In particular, it is known that cytokinines and gibberellics stimulate plants' accumulation of indolyl-acetic acid (IAA), activating it formation directly in the plant.

Both variants of the proposed bioproduct therefore are distinguished advantageously from all known bioproducts by their combination of 3 classes of phytohormones, which ensures a technical result from the use of the bioproduct involving guaranteed support for a natural balanced combination of phytohormones that works in an integrated fashion to ensure the best conditions for different stage plant growth.

The composition of the proposed bioproduct is distinguished by an original combination of phytohormones with substances that possess fungicidal and bactericidal activity.

Moreover, during the other substances beneficial to plants were detected in the composition of the bioproduct. The most effective quantitative ratios of those substances with those already in the bioproduct are established during the ongoing study: B vitamins, a combination of strains of rhizosphere microorganisms—phytopathogen antagonists, including *PSEUDOMONAS* aureofaciens and others.

The use of the proposed inventions supports the production of a large quantity of inexpensive, effective and reliable integrated bioproduct, first for pre-planting treatment of seeds (tubers, bulbs) and then for subsequent foliar treatment of plants, with a complex, naturally balanced composition that is environmentally safe, yields highly effective results and can be used to develop a new system of biological farming that is easily combined with traditional technologies for the use of fertilizers and, at the same time, supports a gradual reduction in the consumption of environmentally hazardous mineral fertilizers and chemical plant protectants, ultimately making it possible to eliminate them entirely.

This hypothesis is supported by studies conducted by the authors for the last few years from 2005 through 2008, which showed that one low-capacity unit for production of the proposed bioproduct, for example a Greentec Ltd. (Nizhny Novgorod Region) unit at the Balakhna Poultry Farm (Nizhny Novgorod Region) is environmentally safe and easy to maintain, built using the group of inventions according to RF No. 2315721, capable of fully meeting the need for highly effective bioproduct of all the farm enterprises in Nizhny Novgorod Region while guaranteeing the required yields and the high quality of the farm product (even under the harsh conditions of a region with high-risk farming) while simultaneously lowering the cost to make that product (including a reduction in energy costs through the use of the biogas byproduct) and while increasing both the "greenness" of the region and easing the working and living conditions of farm enterprise specialists.

As a result of study performed by the authors with specialists from various Russian scientific institutions (Moscow, Nizhny Novgorod, Syktyvkar, Pyatigorsk, Kursk, Perm) to qualify and quantify the group of phytohormones in the proposed bioproduct, the recommended dilution of a sample (i.e., the ratio of the amount of initial product and the working solution or water) is:

for the first variant of the claimed bioproduct (Prorastin) for pre-planting treatment of seeds (tubers, bulbs) in the form of a solution for treatment according to standard technologies on standard equipment is 30-100;

for the second variant of the claimed bioproduct (Polystin) for application at the grain, ornamental, and vegetable crops and potatoes in the form of a solution for spraying plants in various phases of vegetation is 50-200.

During experiments on the use of the proposed bioproduct the cost-effectiveness of the bioproduct was compared with chemicals used on farms for the same purposes.

Let us examine one of the examples (2) of the results of the use of Prorastin compared to the widely used Stinger for treating winter wheat seeds.

TABLE 2

Rate of Consumption of Prorastin: 0.3 L/t of seeds, dilution 1:30.

| | Base scenario | Transitional scenario | | New scenario |
|---|---|---|---|---|
| Products used | Stinger | Stinger + Prorastin | | Prorastin |
| Consumption per ton of seeds | 0.5 L | 0.25 L | 0.3 L | 0.3 L |
| Price of product per liter, RUR | 600 | 600 | 150 | 150 |
| Cost to process 1 ton of seeds | 300 | 150 + 45 = 195 | | 45 |
| 1 ha (250 kg of seed per ha), RUR | 75 | 49 | | 11 |
| Cost reduction compared to base scenario | | 1.5 times | | 6.5 times |

Polystin can also be used by itself and in combination with post-germination chemicals.

Let us consider one of the examples (3) of the results of using Polystin compared to the known systemic post-germination herbicide Agritox to treat plantings of spring wheat.

TABLE 3

Treatment scenario

| | Base scenario | Transitional scenario | | New scenario |
|---|---|---|---|---|
| Products used | Agritox | Agritox + Polystin | | Polystin |
| Price of product per liter, RUR | 280 | 280 | 80 | 80 |
| Consumption per ha | 1.2 L | 0.6 L | 1 L | 2 L |
| Cost to process 1 ha, RUR | 336 | 168 + 80 = 248 | | 160 |
| Cost reduction compared to the base scenario | | 1.3 times | | 2.1 times |

On this basis one might draw the unambiguous conclusion that the use of both variants of the proposed bioproduct is economically very beneficial, since the costs, both to treat seeds (tubers, bulbs) and to treat plants are far (many times over) lower than the use of chemicals for similar purpose. This proves the economy and benefit of using any variant of the proposed bioproduct, which are combined with their high selective effectiveness for various kinds of plant processing.

As already noted above, the authors and various specialists in the field performed multiple experiments to develop and use the claimed bioorganic product in both variants, including field tests on different crops and soils at various agricultural enterprises.

Let us consider several more examples of the use of the proposed bioproduct.

EXAMPLE 4

Pre-sowing treatment with Prorastin of seeds of Bezenchukskaya 308 winter wheat at the Leninskaya Iskra Collective Farm, Yadrin District, Chuvash Republic, 2008.

Prorastin was used in the form of an aqueous solution for treating seeds using standard technologies on standard equipment.

Product consumption rate: 0.3 L/t of seeds.
Dilution with water: 1:30.
No chemicals, fertilizers or plant protectants were used.
The results of the experiment established the following:
The use of Prorastin to treat winter wheat seeds promotes:
earlier appearance of sprouts (2-3 days), and the sprouts are more concurrent and even;
an increase in winter wheat yield by 36%.

EXAMPLE 5

Pre-sowing treatment of Raushan barley seeds using Prorastin at the Center of the Nizhny Novgorod Agrochemical Service, Nizhny Novgorod Region, 2008 (see the report of the Nizhny Novgorod Agrochemical Service Center on "Small Plot Experiments to Study Bioproducts," 2008, page 5). The Prorastin consumption rate: 0.1 L/t of seeds.
Dilution 1:100.
No chemicals or plant protectants were used.
Mineral fertilizes in a dose (NPK)30 were used in each scenario (except the control.
The results of the experiment established the following:
The use of Prorastin to treat Raushan barley seeds compared with the control scenario showed:
sprouts more concurrent and even (plantings on the control plots were sparse);
a stronger root system forms;
the plant stems are stronger, with larger lamina;
plant height reaches 28-30 cm (20 cm at control plots);
the number of productive stalks reaches 5-6 (2-3 at the control);
a 63% increase in yield compared to the control without fertilizer (increase of 7.3 hwt/ha) and 11% compared to processed with mineral fertilizer-alone (NPK)30 (increase of 1.9 hwt/ha);
a 5% increase of protein content in grain.

Studies of the effect of the proposed bioproduct on seed germination energy demonstrated an increase in this energy in all crops without exception. The use of the bioproduct promotes concurrent, even sprouts, healthy plant development and a substantial increase in yield.

The increase in seed germination energy clearly demonstrates the positive impact of the gibberellics, cytokines, and auxins in the proposed bioproduct and the synergistic stimulating action of the humic acids.

EXAMPLE 6

To study the influence of the second variant of the claimed bioproduct (Polystin) on spring wheat crops at the Zabolotnovsky Agricultural Cooperative, Nizhny Novgorod Region, experiments were performed in 2008 according to the methodology for state testing of agricultural crops (see the Zabolotnovsky Agricultural Cooperative report on "Tests of Polystin on spring grain crops", Nizhny Novgorod. 2008, pp. 2-3) on wheat and oat crops.

Darya spring wheat, Moskovskaya-35 spring wheat and Dens spring oats were treated with Polystin.

The bioproduct consumption rate: 2 L/ha, dilution 1:100.

Application method: plant spraying (tillering phase).

The bioproduct was used in combination with the systemic post-germination herbicide Agritox.

The results of the experiment established the following positive trends for all crops:

grain crop plants are visually stronger and sturdier than plants treated with herbicide alone;
plants 10 cm higher for Darya wheat and Moskovskaya-35 wheat, 15-20 cm higher for Dens oats;
a greater number of productive stalks forms;
the grain emerges larger, there are no puny grains;
the plants' root system is more developed;
the increase in the harvest is shown in table 4.

TABLE 4

| Crop | Darya spring wheat | Moskovskaya-35 spring wheat | Dens oats |
|---|---|---|---|
| Increase in harvest, hwt/ha | 3.6 | 2.0 | 5.3 |
| Increase in harvest as % of control | 13.0 | 9.2 | 22.0 | the protein content of the oats increased by a factor of 1.36.

EXAMPLE 7

The effectiveness of the use of Polystin was studied on different varieties of potato at the test farm of Kursk State Agricultural Academy in 2008 (see the report of the Kursk State Agricultural Academy on: Test of Polystin on Potato Varieties in Various Maturity Groups, 2008, pp. 3, 4).

The plants were treated with Polystin by spraying a solution of the bioproduct on the leave surface of the bush 3 weeks after the blossoming phase ended (about 2-3 weeks before harvest, depending on the maturity group of the potato varieties). The bioproduct consumption rate: 0.1 L/ha, dilution 1:100.

The results appear in tables 5 and 6.

TABLE 5

Effect of Polystin on Vegetative Mass, Harvest Structure and Yield of Potato Varieties

| Variant | Height, cm | Number of stalks | Number of leaves | Leafiness, leaves/bush | Weight of raw tops, g | Average leaf area, $cm^2$ | Tubers, pc Large | Medium | Small | Total | Weight of tubers, g | Weight of average tuber, g | Length of roots and stolons, cm | Weight of roots and stolons, g | Yield, hwt/ha |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 |
| Snegir (early maturing) | | | | | | | | | | | | | | | |
| Control | 45 | 5 | 11 | 55 | 300 | 80 | 2 | 3 | 1 | 6 | 590 | 98.3 | 24 | 40 | 236 |
| Spraying | 50 | 5 | 12 | 70 | 330 | 87 | 3 | 4 | — | 7 | 700 | 100.0 | 35 | 56 | 280 |
| Ilyinsky (medium early maturing) | | | | | | | | | | | | | | | |
| Control | 48 | 5 | 12 | 60 | 380 | 90 | 2 | 3 | 3 | 8 | 650 | 81.3 | 34 | 50 | 260 |
| Spraying | 52 | 5 | 12 | 60 | 400 | 115 | 3 | 4 | 2 | 9 | 780 | 86.7 | 40 | 55 | 312 |
| Lena (medium maturing) | | | | | | | | | | | | | | | |
| Control | 55 | 6 | 15 | 90 | 500 | 125 | 3 | 4 | 4 | 11 | 800 | 74.5 | 38 | 60 | 280 |
| Spraying | 57 | 6 | 18 | 108 | 800 | 128 | 4 | 6 | 1 | 12 | 980 | 81.7 | 45 | 68 | 343 |

TABLE 6

Effect of Polystin on Market and Process Properties of the Potato Varieties

| Variant | Yield, hwt/ca | Increase hwt/ca | Increase % | Merchantability | Reproduction rate tubers | Reproduction rate weight | Starch, % | Nitrates, mg/kg $No_3^-$ Small | Vitamin C, mg/% Total |
|---|---|---|---|---|---|---|---|---|---|
| Snegir (early maturing) | | | | | | | | | |
| Control | 236 | — | — | 83.3 | 5 | 9.1 | 14.0 | 87.0 | 20.0 |
| Spraying | 280 | 44 | 18.6 | 100.0 | 7 | 10.7 | 14.2 | 68.0 | 40.0 |
| Ilyinsky (medium-early maturing) | | | | | | | | | |
| Control | 260 | — | — | 62.5 | 5 | 10.0 | 16.8 | 79.0 | 25.0 |
| Spraying | 312 | 52 | 20.0 | 77.8 | 7 | 12.0 | 17.1 | 56.0 | 33.0 |

TABLE 6-continued

Effect of Polystin on Market and Process Properties of the Potato Varieties

| Variant | Yield, hwt/ca | Increase hwt/ca | % | Merchant-ability | Reproduction tubers | rate weight | Starch, % | Nitrates, mg/kg $No_3^-$ Small | Vitamin C, mg/% Total |
|---|---|---|---|---|---|---|---|---|---|
| | | | | Lena (medium maturing) | | | | | |
| Control | 280 | — | — | 63.6 | 7 | 12.3 | 18.4 | 50.0 | 15.0 |
| Spraying | 343 | 63 | 22.5 | 83.3 | 10 | 15.1 | 18.8 | 32.0 | 27.0 |

Even a single application of Polystin caused positive changes in both the vegetative mass of the potato and the structure and quality of the harvest.

The structure of the harvest exhibited significant changes: the number of tubers in the tuber cluster increased, and the number of large and medium tubers increased, which promoted the growth of merchantability from 63-83% to 83-100%. The percentage of small tubers decreased. The weight of the average tuber rose to 87-100 g compared to the control (without the bioproduct)-74-81 g. The yield for all varieties rose substantially (by 18.6% for Snegir, 20% for Ilyinsky, and 22.5% for Lena).

In all varieties the starch content in the tubers increased, the nitrate content fell by a factor of 1.3-1.6, and the vitamin C content rose by a factor of 1.3-2.0 depending on the variety.

FIGS. 1-12 are attached to the specification for further graphic illustration of the results of treating plants with the proposed bioproduct. They present the intermediate results of studies conducted in 2009 in Nizhny Novgorod Region.

EXAMPLE 8

Experiments were conducted at the agroindustrial base (AIB) of the Industrial Process Research Institute (NIPTI) in Nizhny Novgorod Region in June-July 2009 on the use of Prorastin and Tebutin for pre-planting seed treatment of ESTER spring wheat.

The figures show the results of the studies, where the following are obvious.

Figure 1:
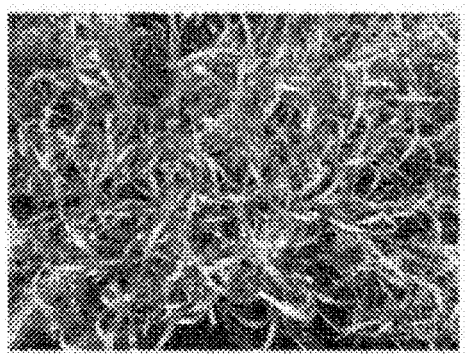
FIG. 1 shows sprouts on 25 Jun. 2009, at the control plot after the seeds were treated with Tebutin.
Figure 2:
FIG. 2 shows sprouts on 25 Jun. 2009 at the experimental plot after the seeds were treated with a mixture of Tebutin+Prorastin.

FIGS. 1 and 2 clearly show that the experimental scenario using Prorastin is distinguished by the density of the planting, the plants are sturdy with a wide lamina and bright dark green color.

Figure 3:

FIG. 3 shows plants at the control plot a month later, 21 Jul. 2009.

Figure 4:

FIG. 4 of 21 Jul. 2009 shows plants at the experimental plot.

The difference in plant height is obvious: in the experiment using Prorastin it is 110-120 cm; at the control −75-90 cm.

Figure 5:
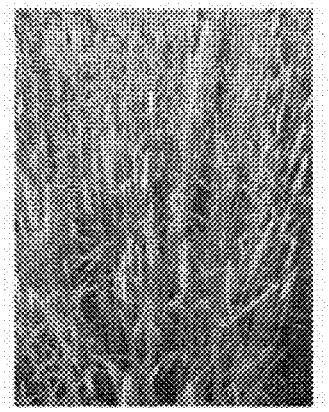
Figure 6:

FIGS. 5 and 6 of 21 Jul. 2009 show ears at the control and experimental plots. The ears in the experimental scenario are clearly better formed and longer (9-11 cm) than the control (8-9 cm).

EXAMPLE 9

Results of comparative experiments of integrated use of both scenarios of the proposed bioproduct (Prorastin and Polystin) for pre-sowing seed treatment and foliar application at the plants of Darya winter wheat at the Zabolotnovsky Agricultural Cooperative, Nizhny Novgorod Region, in June-August 2009 roд a are clearly seen on the figures.

Figure 7:
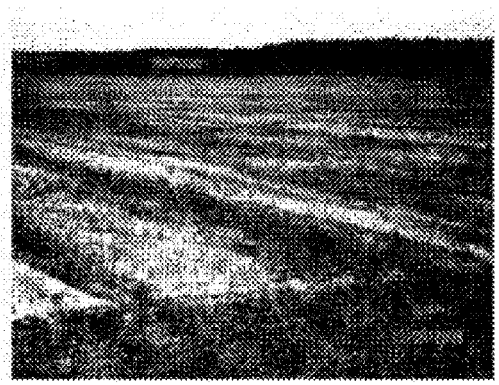

FIG. 7 shows sprouts on 17 Jun. 2009 at the control plot after seeds were treated with Dospekh. The sparsity of the plantings is obvious.

Figure 8:

FIG. 8 shows sprouts on 17 Jun. 2009 at the experimental plot after treatment of the seeds with Prorastin.

Figure 9:
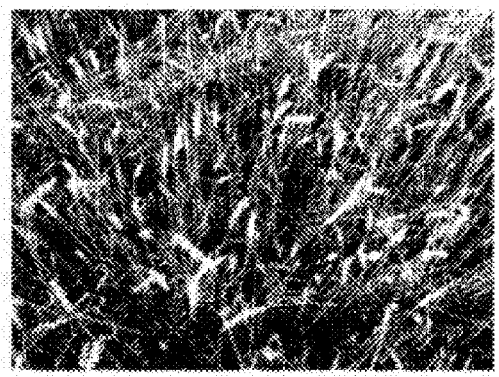
Figure 10:
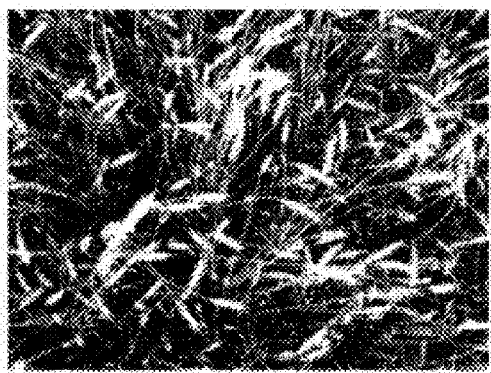

FIGS. 9 and 10 of 22 Aug. 2009 show plants at the control and experimental plots;

FIGS. 9 and 10 clearly show that the experimental scenario using Prorastin is distinguished by noticeably thick plantings; the ears in the experimental scenario are more complete and longer (10-11 cm) that the control (7-8 cm).

Figure 11:
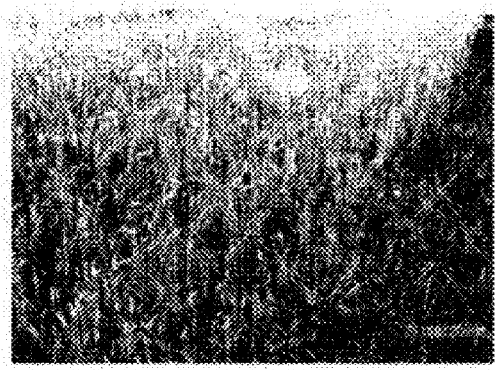
Figure 12:

FIGS. 11 and 12 of 22 Aug. 2009 show general views of the control and experimental plots respectively. The density of the plants in the experiment is greater than in the control. The height of the plants of the experimental plot is 100-105 cm, at the control 70-80 cm. The proper healthy development of plants throughout the vegetation period clearly demonstrates the capabilities of the use of the proposed bioproduct and serves as a pledge of a good harvest. The use of the proposed group of inventions makes it possible to:

1. Increase the efficiency of crop science by significantly increasing the yield of agricultural crops.
2. Save energy and other resources during agricultural work through the use of the minimum amounts of product necessary to treat seeds (tubers, bulbs) and plants.
3. Ensure the high quality of the agricultural product by increasing the content of valuable nutrients in them, for example protein in grain crops, starch in potatoes and vitamin C in vegetables.
4. Ensure high environmental indicators of the product through the use of a natural organic bioproduct alone, which is guaranteed not to contain any impurities or additives, and through the reduction in the rate of consumption of mineral fertilizers and chemical plant protectants.
5. Increase soil fertility to obtain sustained high yields through transferring to the soil both microelements: copper, cobalt and zinc, and the beneficial active microflora contained in the bioorganic product.
6. Lay the foundation for the development of large-scale, environmentally friendly organic farming.
7. Ensure the food security of any region through the use of local renewable resources.
8. During the production of the product, ensure efficient and environmentally friendly utilization of aggressive waste from poultry farms and livestock breeding complexes, significantly improve the environment where those facilities are located, and reduce greenhouse gas emissions into the atmosphere.
9. Increase the energy efficiency of agricultural production by using biogas to produce heat and electricity.

The invention claimed is:

1. A bioorganic product for pre-planting treatment of seeds or tubers or bulbs consisting microbiologically fermented organic agricultural waste, consisting of (i) microelements: copper, cobalt and zinc, and (ii) macroelements: nitrogen, phosphorous and potassium in bound form, such that:

the macroelements consists of, wt. % per absolutely dry substance:

| | |
|---|---|
| total nitrogen | from 4.0 to 7.0 |
| including ammonium nitrogen | from 2.5 to 4.0 |
| phosphorous ($P_2O_5$) | from 7.0 to 12.0 |
| potassium ($K_2O$) | from 1.0 to 3.0 | the microelements consists of, mass concentration, mg/L, no more than:

| | |
|---|---|
| copper | 3.0 |
| cobalt | 5.0 |
| zinc | 23.0 |
| water, wt. % | 85 to 95, | wherein the bioorganic product consists of humic acids, gibberellics, auxins and cytokinines, in the following ratio:

| | |
|---|---|
| humic acids, mg/L | no less than 1000.0 |
| gibberellics, mg/L (with respect to gibberellic acid) | no less than 17.0, |
| auxins, mg/L (with respect to indolyl-3-acetic acid) | no less than 2.5 |
| cytokinines, mg/L (with respect to kinetine) | no less than 200.0 | and wherein the bioorganic product also consists of sulfur and benzoic acid to provide fungicidal and bactericidal properties, wherein the sulfur has a weight concentration of no less than 0.5 mg/L and benzoic acid has a weight concentration of no less than 29.0 mg/L.

2. A bioorganic product for foliar application on cereals, vegetables, ornamental crops and potatoes consisting of microbiologically fermented agricultural waste consisting (i) microelements: copper, cobalt, and zinc, and (ii) macroelements: nitrogen, phosphorous and potassium in bound form, such that:

the macroelements consists of, wt. % per absolutely dry substance:

| | |
|---|---|
| total nitrogen | from 4.0 to 7.0 |
| including ammonium nitrogen | from 2.5 to 4.0 |
| phosphorous ($P_2O_5$) | from 7.0 to 12.0 |
| potassium ($K_2O$) | from 1.0 to 3.0 | the microelements consists of, mass concentration, mg/L, no more than:

| | |
|---|---|
| copper | 3.0 |
| cobalt | 5.0 |
| zinc | 23.0 |
| water, wt. % | 85 to 95, | wherein the bioorganic product consists of fulvic acids, gibberellics, auxins and cytokinines, in the following ratio:

| | |
|---|---|
| fulvic acids, mg/L | no less than 1000.0 |
| gibberellics, mg/L (with respect to gibberellic acid) | no less than 34.0, |
| auxins, mg/L (with respect to indolyl-3-acetic acid) | no less than 3.0 |
| cytokinines, mg/L (with respect to kinetine) | no less than 500.0, | and wherein the bioorganic product also consists of sulfur and benzoic acid to provide fungicidal and bactericidal properties, wherein the sulfur has a weight concentration of no less than 0.5 mg/L and benzoic acid has a weight concentration of no less than 29.0 mg/L.

3. The bioorganic product of claim 1, wherein the bioorganic product and a diluent have a ratio between 1:30 and 1:100 to provide a consumption rate of the bioorganic product between 0.1 and 0.3 liters per ton of seeds.

4. The bioorganic product of claim 2, wherein the bioorganic product and a diluent have a ratio between 1:100 and 1:200 to provide a consumption rate of the bioorganic product between 1.0 and 2.0 liters per hectare.

* * * * *